June 29, 1954 J. H. TAYLOR 2,682,140
TANDEM DISK HARROW
Filed Feb. 25, 1952 7 Sheets-Sheet 1

Inventor
J. H. TAYLOR
By Lancaster, Allen & Rommel
Attorneys

June 29, 1954 J. H. TAYLOR 2,682,140

TANDEM DISK HARROW

Filed Feb. 25, 1952 7 Sheets-Sheet 2

Inventor

J. H. TAYLOR

By Lancaster, Allwine & Rommel

Attorneys

June 29, 1954 J. H. TAYLOR 2,682,140

TANDEM DISK HARROW

Filed Feb. 25, 1952 7 Sheets-Sheet 3

Inventor

J. H. TAYLOR

By Lancaster, Allwine & Rommel

Attorneys

June 29, 1954 J. H. TAYLOR 2,682,140

TANDEM DISK HARROW

Filed Feb. 25, 1952 7 Sheets-Sheet 4

Inventor

J. H. TAYLOR

By Lancaster, Allwine & Rommel

Attorneys

June 29, 1954 J. H. TAYLOR 2,682,140

TANDEM DISK HARROW

Filed Feb. 25, 1952

7 Sheets-Sheet 5

Inventor

J. H. TAYLOR

By Lancaster, Allwine and Rommel

Attorneys

Inventor
J. H. TAYLOR
By Lancaster, Allen & Rommel
Attorneys

June 29, 1954

J. H. TAYLOR

TANDEM DISK HARROW 2,682,140

Filed Feb. 25, 1952

7 Sheets-Sheet 7

Inventor

J. H. TAYLOR

By Lancaster, Allwine & Rommel

Attorneys

Patented June 29, 1954 2,682,140

UNITED STATES PATENT OFFICE 2,682,140

TANDEM DISK HARROW

Joseph Herschel Taylor, Athens, Tenn.

Application February 25, 1952, Serial No. 273,253

5 Claims. (Cl. 55—81.1)

This invention relates to improvements in tandem disc harrows.

The primary object of this invention is the provision of an improved tandem disc harrow embodying certain principles set forth in my copending application Ser. No. 19,119, filed April 5, 1948. The latter application relates to a disc type harrow having a pair of complementary arranged transversely disposed disc gangs, the mounting and operating principles of which are a characteristic of the front section of the tandem disc harrow of this application, and disposed in reverse upon a rear section; improved means being provided whereby the gangs of the rear section will hold the same degree of angle under recurring plowing conditions.

In conventional tandem type disc harrows the gangs during turning action, particularly the rear section gangs, will be thrown at unpredictable angles, not related to the radius of the turn, and very often tear up larger furrows than desirable. The present plow does away with this.

A further object of this invention is the provision of an improved tandem disc harrow in which the rear section is so accurately controlled with respect to the angling of the disc gangs of the front section that angular control of the rear disc gangs during turning of the harrow can be accurately gaged for the plowing of satisfactory and proper furrows.

A further object of this invention is the provision of improved control means disposed between the disc gangs of a front section of a tandem disc harrow and the gangs of the rear section of the plowing harrow, so that the rear gangs can be identically controlled under recurring plowing conditions.

Other objects and advantages of this invention will be apparent during the course of the following detailed description.

In the accompanying drawings, forming a part of this specification, and wherein similar reference characters designate corresponding parts throughout the several views.

Figures 1, 17:
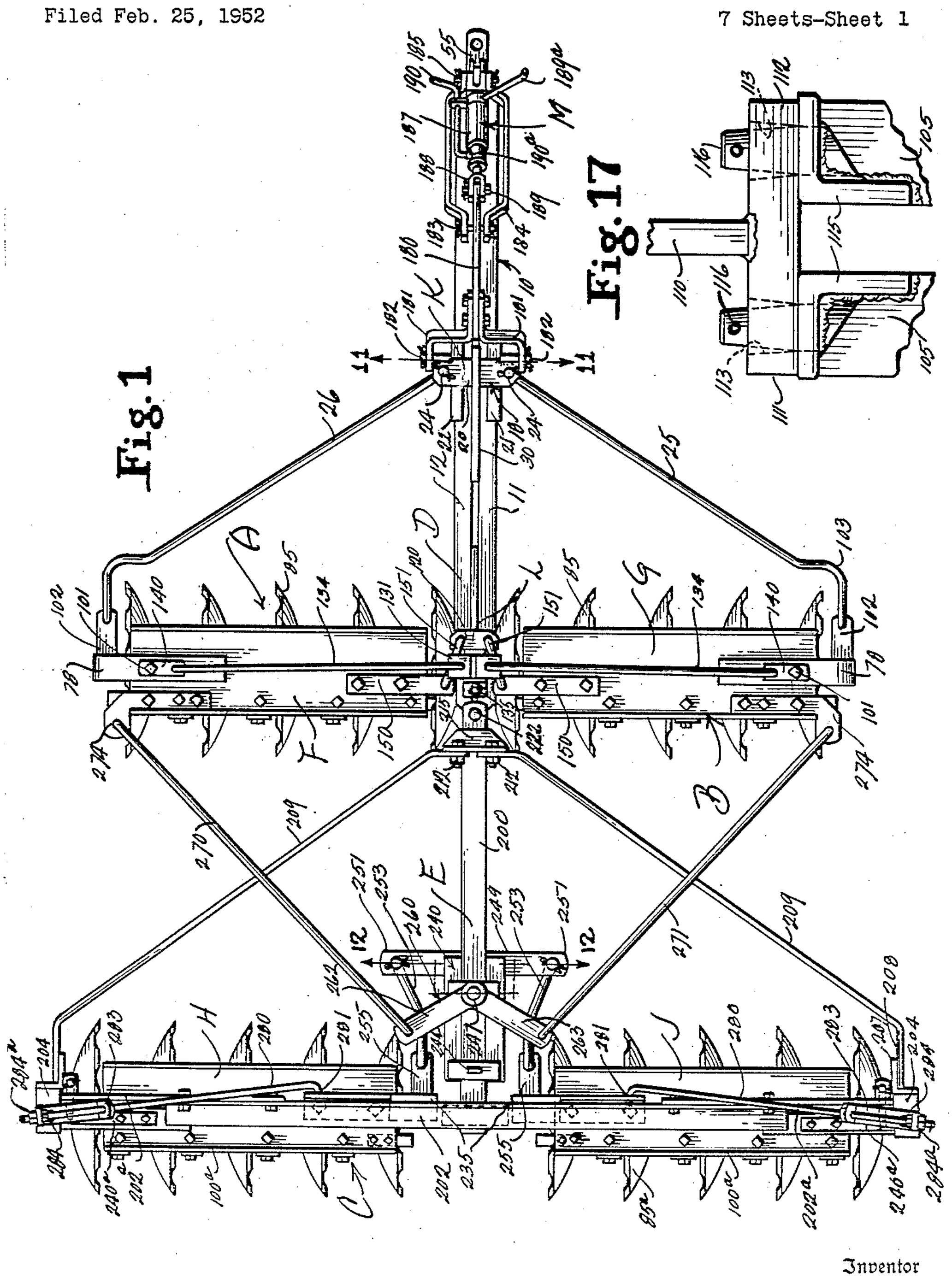
Figure 1 is a plan view of the improved tandem disc harrow with the disc gangs of each section transversely aligned.
Figure 17 is a fragmentary view showing the inner draft connections of the disc gangs of the front section with respect to the rear frame structure.

In the drawings, wherein for the purpose of illustration is shown a preferred form of the invention, the letter A may generally designate the tandem disc harrow. It includes a front section B and a rear section C. Respectively the sections B and C are provided with frames D and E. The front section B is provided with disc gangs F and G connected upon the frame D having a front draft connection K therewith and a rear draft connection L. The rear section C is provided with rear gangs H and J operatively connected upon the frame E and also to the front disc gangs F and G. Hydraulic means M is provided to shift the angled position of the disc gangs.

Figure 11:
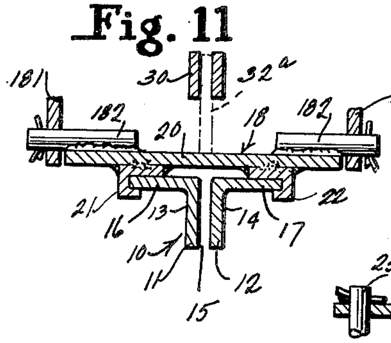
Figures 11 and 12 are transverse cross sectional views taken substantially on their respective lines shown in Figure 1 of the drawings.

Referring to the frame structure D, the same includes a tongue 10 formed of a pair of angled irons 11 and 12, positioned as shown in Figure 11 with the vertically positioned flanges 13 and 14 thereof spaced to provide a passageway 15. The upper flanges 16 and 17 lie in the same plane and are adapted to slidably receive the front draft connection box structure 18 thereupon. The latter includes a top plate 20 having welded at the underside thereof guide channels 21 and 22 which slide on the flanges 16 and 17 of the tongue structure, as shown in Figure 11. The box plate 20 is provided with laterally projecting ends which are pivotally connected to the upstanding ends 24 of the draft links 25 and 26; cotter pins being provided to maintain them in place.

Figure 2:
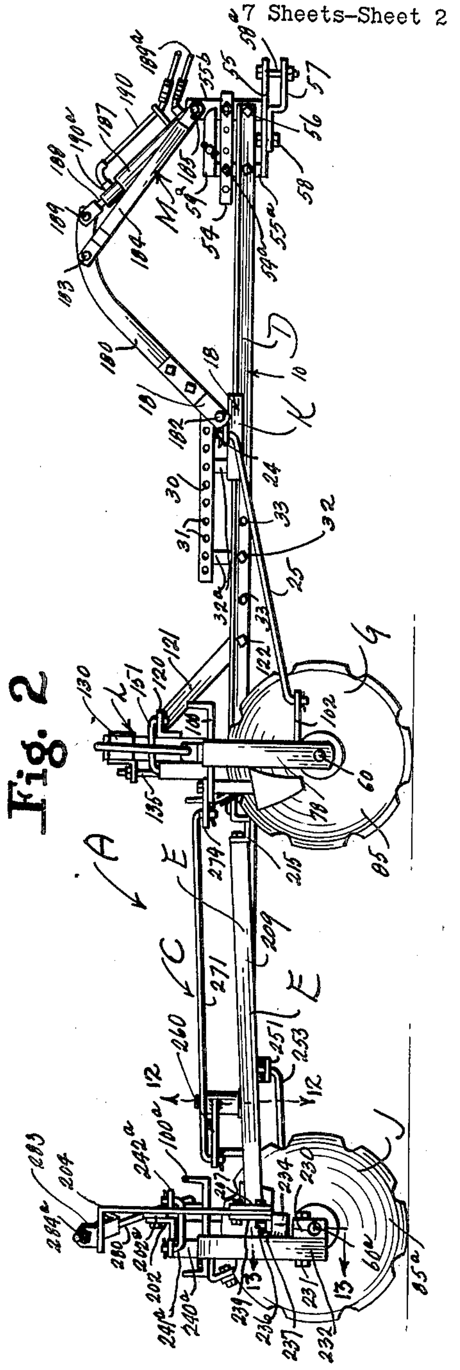
Figure 2 is a side elevation of the tandem disc plowing harrow in the position shown in Figure 1.

The slide box is intended to slide along the tongue structure for the purpose of angling the disc gangs. For this purpose an adjustment bar 30 is provided as shown in Figure 2 having a plurality of openings 31 therethru. Depending attaching standards $32^a$ are detachably connected at 32 upon the tongue structure 10, in the space between the angles, forming the tongue structure, and for major adjustments the tongue structure may be provided with other openings 33 therein to receive the bolts 32. The latch structure holding the angled position of the disc gangs thru the slide box shown in my co-pending application Ser. No. 19,119, filed April 5, 1948, may be employed, or the hydraulic means M may be used for that purpose.

Referring to the clevis type draft connection for the tongue 10, the same possesses some of the same characteristics of the connection set forth in my co-pending application above identified, except in so far as it is adapted for connection with the hydraulic means M for control of the slide box and gangs. It includes an upper supporting part 55 detachably connected as at 56 with the tongue angles thru standards $55^a$ and $55^b$. The clevis can be vertically adjusted in the manner described in my co-pending application, if so desired. It includes a lower part 57, pivotally connected at 58 to the stationary tongue connecting part 55. The parts 55 and 57 at their forward ends receive a detachable draft connecting pin $58^a$. When the latter is removed the part 57 can be swung sideways. This clevis arrangement will prevent shimming, running sidewise, dipping, digging in and running at an uneven depth, and permits smooth even mulching of the soil. The top of the standards $55^a$ and $55^b$ are connected by a top cross piece $59^a$. The purpose of the hydraulic mechanism M is to move the slide box 18 forward and rearward upon the tongue 10 for the purpose of regulating gang angling. At its forward end it is connected to the clevis standard $55^b$ by means of a detachable bolt 185. A substantially U-shaped stop rail 54 is provided, having transverse openings at spaced distances therealong for receiving pins or bolts $54^a$ connectable to the standards $55^a$ and $55^b$, whereby its extreme rear end may be suitably placed to limit the forward movement of the slide box mechanism 18.

Figure 8:
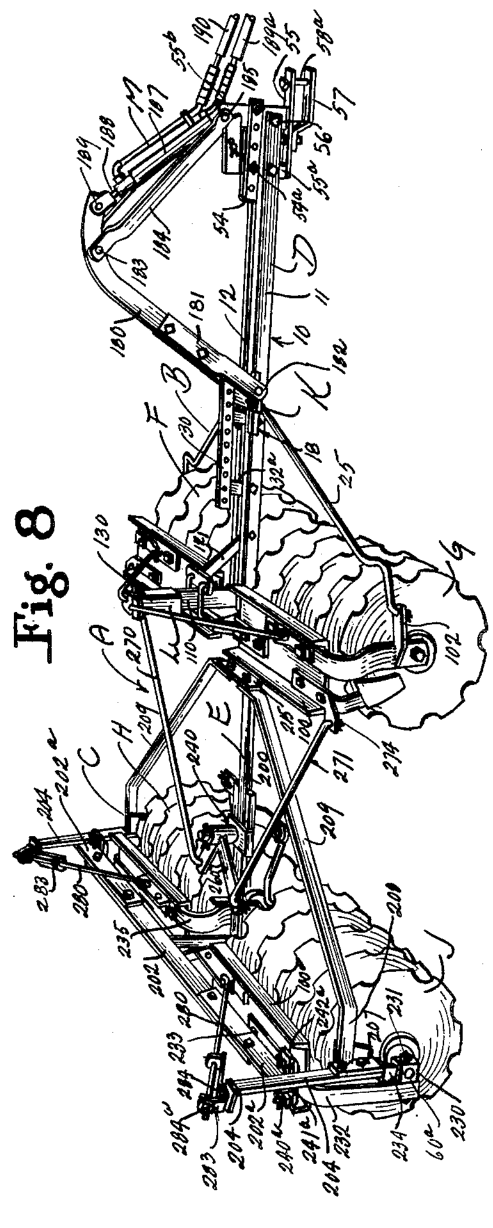
Figure 8 is a perspective view of the improved tandem disc plowing harrow, showing various details thereof.
Figure 3:
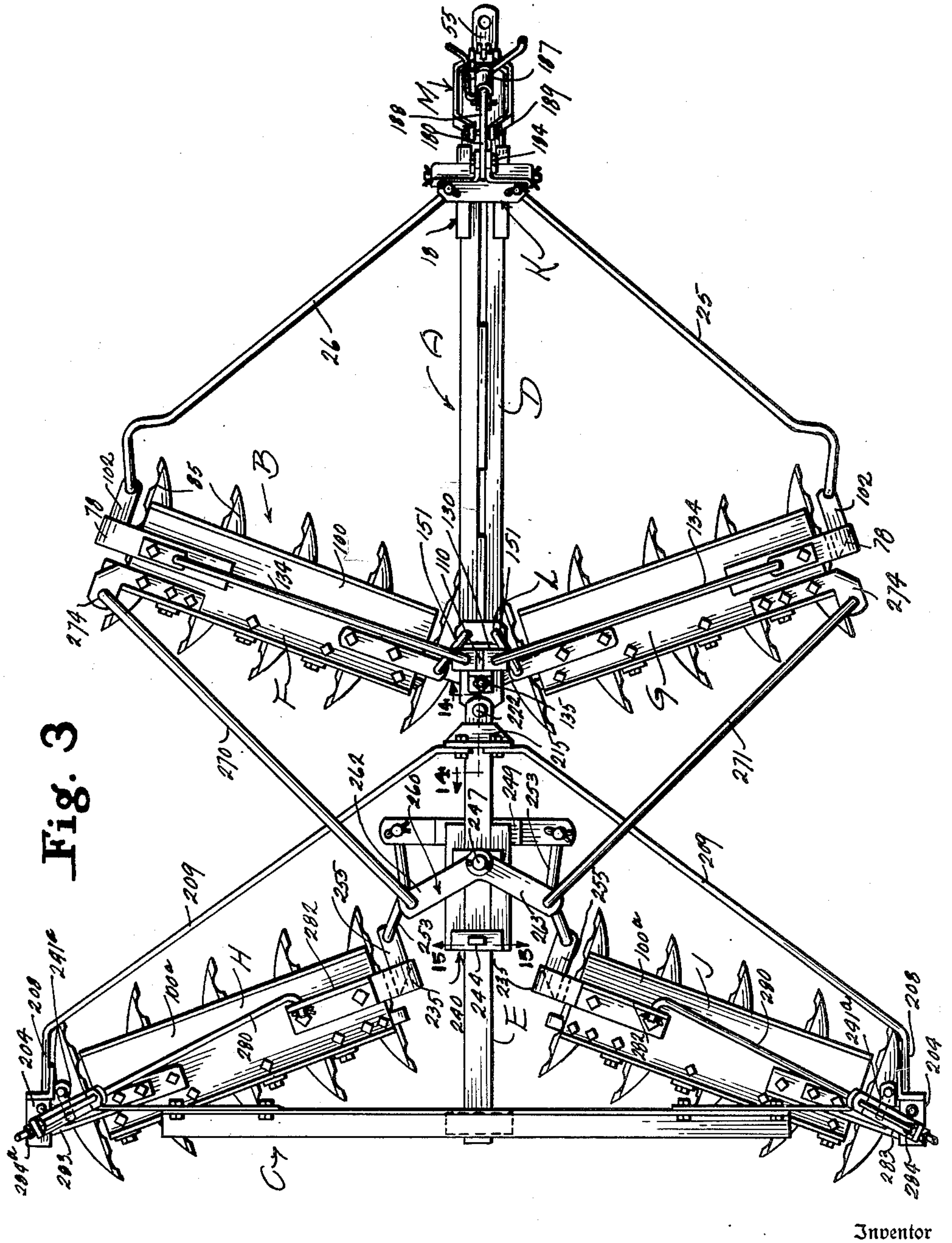
Figure 3 is a plan view of the tandem disc plowing harrow with the disc gangs of the sections in angled plowing position.
Figures 6, 10:
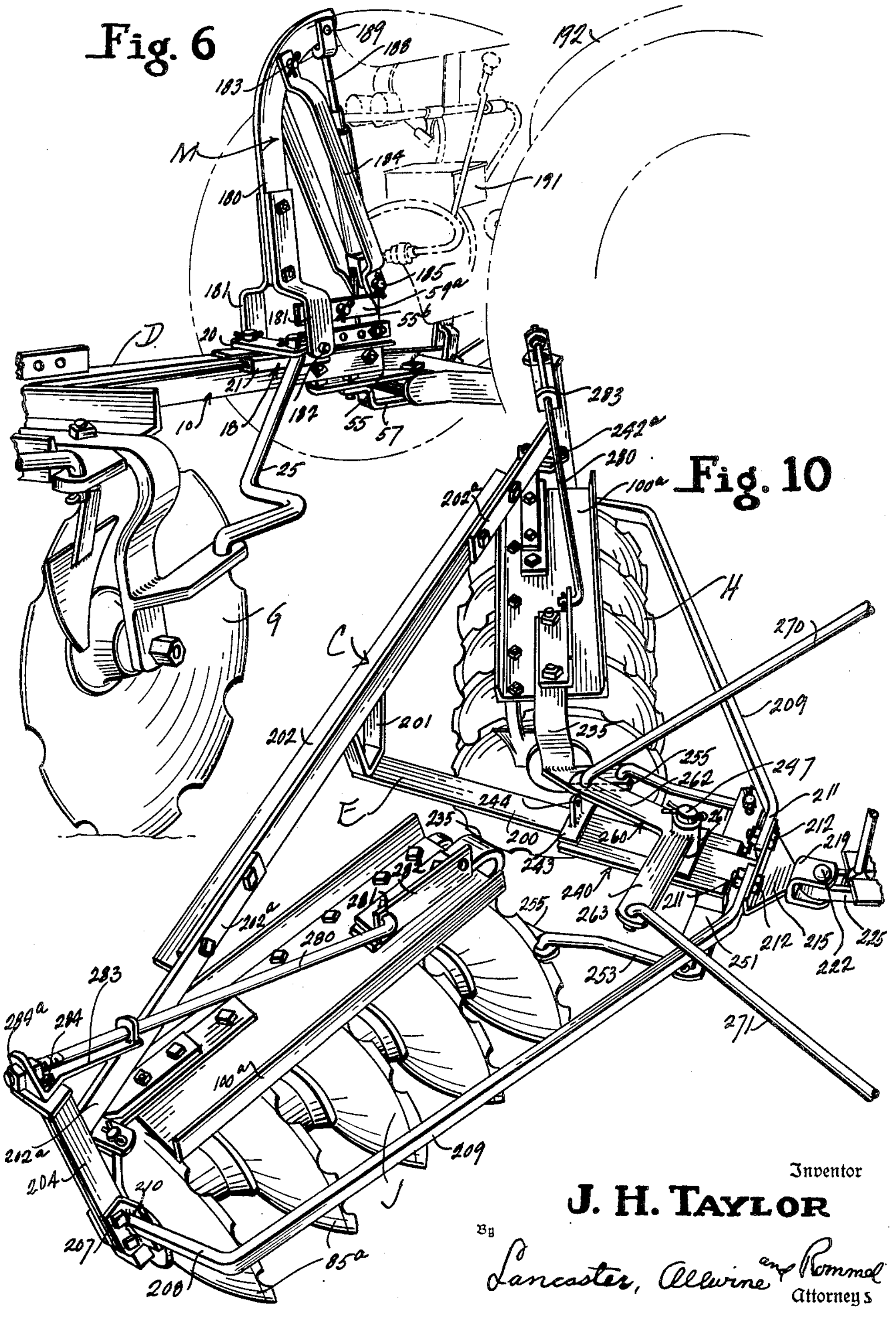
Figure 6 is a perspective view of hydraulic control mechanism for manipulating the angled position of the disc gangs.
Figure 10 is a perspective view of the rear section of the tandem disc plowing harrow, showing the position of the disc gangs and the control means therefor during the making of a turn.

Referring now to the hydraulic mechanism M for controlling angling of the disc gangs the same includes an arm 180 having a bifurcated end 181 pivoted to pins 182 which are welded on the plate 20 of the slide box 18, as shown in Figures 1 and 11. The arm 180 extends forwardly and between its ends it is pivoted at 183 to an open frame structure 184 comprising a pair of spaced arms the opposite ends of which are pivoted at 185 to the upper end of the clevis standard $55^b$, as shown in Figures 2, 6 and 8 of the drawings. An hydraulic cylinder 187 is pivoted upon the pin 185 at its forward end. This cylinder 187 has the usual hydraulic piston (not shown), including a piston rod 188 which is pivoted at 189 at the fore end of the lever 180. Flexible hose connections $189^a$ and 190 are provided for receiving oil; the oil being supplied under pressure and suction from the hydraulic pump mechanism indicated in dot and dash lines at 191 of the draft tractor or vehicle 192, as shown in Figure 6. The hose connection $189^a$ is connected to the fore end of the cylinder, and the other hose connection 190 has a connection $190^a$ with the opposite end of the cylinder. These connections are at opposite sides of the piston (not shown) and the fluid will reciprocate the piston rod and move the operating lever 180 and the frame 184 between the positions shown in Figures 2 and 6 of the drawings. In the position shown in Figure 2 the hydraulic mechanism holds the slide box to the rear with the disc gangs of both sections in transverse alignment and in the position shown in Figure 6 the slide box is at its forward limited position in which the gangs are angled as shown in Figure 3. In this position the slide box or some part thereof will abut the stop member 54 to limit the maximum angling of the disc gangs.

Referring to the gangs F and G, each of the same is of the construction set forth in my above identified co-pending application and includes a dead axle 60 having a rotatable cylinder 61 mounted thereon. The cylinder 61 is mounted upon anti-friction bearings as described in said co-pending application and is provided with discs 85 of any desired number, depending upon the length of the axle. The outer ends of the axle 60 are provided with bracket arms 78, and the inner ends are each provided with an attaching block 70 welded thereon as shown in Figure 16.

Each disc gang includes a weight box 100 of channel shaped formation adapted to receive suitable weights for enabling equal penetration of the discs during plowing, particularly over rough or unplowed surfacing. The outside frame brackets 78 of the gangs are properly bowed and their top ends overturned and secured to the bottom of the weight boxes 100, being bolted thereto as at 101. The brackets 78 have forward welded extensions 102 pivotally receiving the rear ends of the draft links 25 and 26. The latter are bowed at 103 to ward off objects during plowing.

Figures 4, 5:
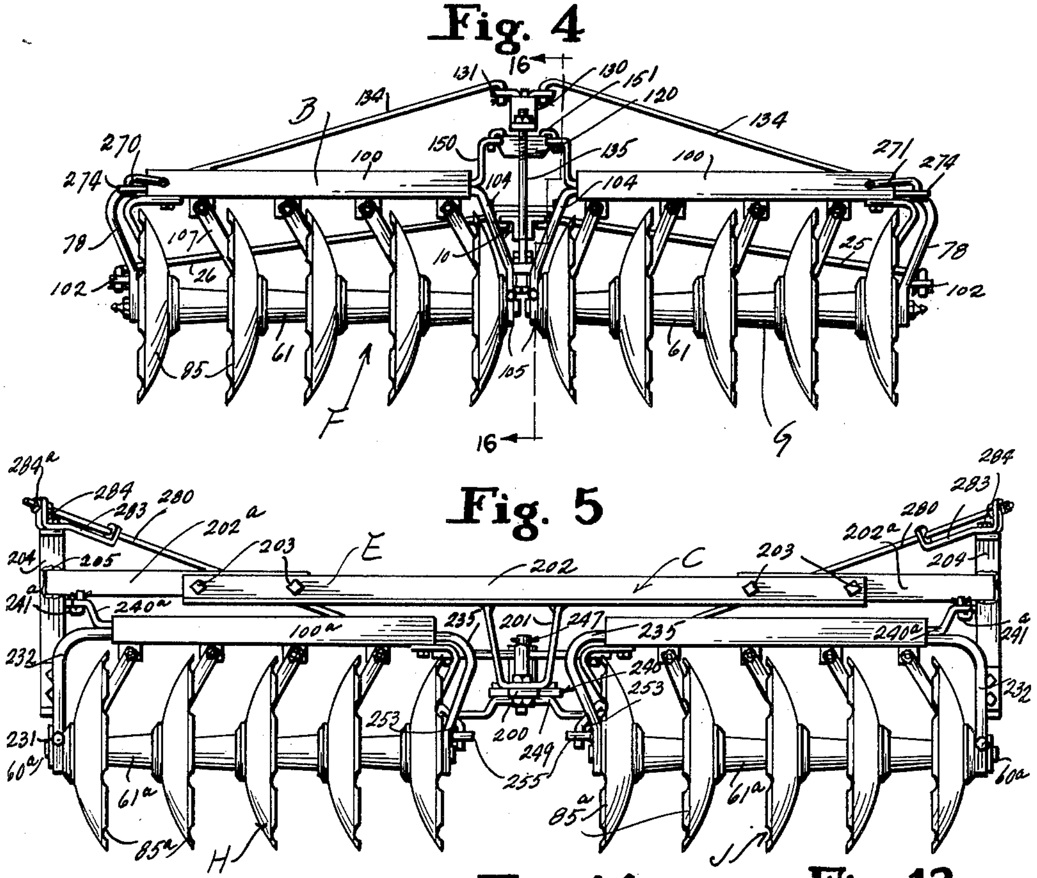
Figure 4 is a rear elevation of the front section of the tandem disc plowing harrow with the disc gangs in transversely aligned relation.
Figure 5 is a rear elevation of the gangs of the rear section of the tandem disc plowing harrow; the disc gangs being in aligned relation.
Figure 16:
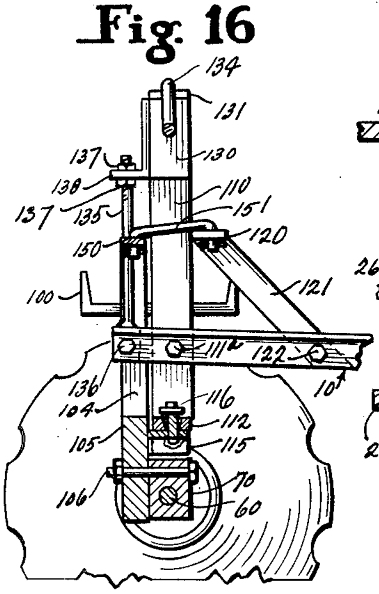
Figure 16 is a cross sectional view, showing more particularly the rear draft connections for the disc gangs of the front section and the adjacent ends of said disc gangs, the view being taken substantially on the lines 16—16 of Figure 4.

The inner ends of the channel boxes 100 are provided with detachable connecting brackets 104, shown in Figures 4 and 16 of the drawings. They have lower vertically positioned end portions 105 connected to the upper ends of attaching blocks 70, as by bolts 106. The under sides of the weight boxes 100 have suitable scrapers 107.

Referring to the inner draft connection L for the gangs, a standard 110 is provided. It is very sturdy and extends thru the space between the tongue angles and is bolted thereto at $111^a$ (see Figure 16). At its lower end it has lateral extensions 111 and 112, best shown in Figure 17 provided with vertically disposed openings 113, flaring divergently upward. The gang bracket arms 104 are each provided with forwardly disposed welded extensions 115, shown in Figures 16 and 17 having secured to the top flanges thereof upwardly extending tapered spindles or studs 116 adapted to seat in the tapered openings 113. Thus, they have a rocking action in said openings, and such will occur when the gangs are lifted in a vertical plane for varying the vertical angle at the outer ends of the gangs under circumstances more specifically described in my copending application above mentioned. The standard 110, in addition to its bolting at 111$^a$, is also secured in position by means of an angle piece 120, having a brace rod 121 connected therewith and to the tongue 10 at 122. The standard 110 has a rearward inclination at its top of 2½°.

A vertically adjustable sleeve box 130 is nonrotatable but slidably mounted upon the upper end of the standard 110. It has laterally extending wings 131 to which the upper and inner ends of supporting and connecting rods 134 are secured. The sleeve box 130 is maintained in spaced adjustment with respect to the rear end of the tongue 10 by means of a supporting standard 135, shown best in Figure 16. The standard 135 is bolted at 136 between the angles of the tongue 10. It has at its upper screw threaded end a pair of nuts 137, between which an extension 138 of the slide sleeve 130 is bolted. The outer ends of the rods 134 are pivotally connected to apertured ears of straps 140 attached to the channels as shown. By adjusting the nuts 137 the sleeve can be moved along the standard to vary the vertical adjustment of the outer ends of the gangs.

Bracket extensions 150 are furthermore provided at the inner ends of the channels 100, link connected at 151 with the angle piece 120 above described. These links provide support for the gangs at their inner ends in addition to the lower draft connections above described and they also enable the outer ends of the disc gangs to gradually lift as they are swung from their axially aligned positions into forward angled positions. This action takes place because of the off vertical position of the standard 110, as mentioned in my copending application above set forth.

As the disc gangs are angled forwardly at their outer ends they are gradually elevated until the lowermost edges of the discs lie in a plane at an acute angle to the horizontal.

Figure 14:
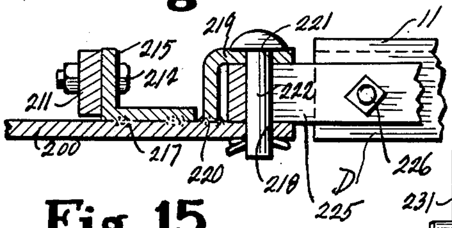
Figures 14 and 15 are transverse cross sectional views taken upon their respective lines shown in Figure 3 of the drawings.

Referring now to the rear section C the frame structure E comprises a central rail 200 intended to be swivelly draft connected to the rear end of the frame structure of the front section, as will be subsequently described. The frame rail 200 may take any desired form, and at its rear end it is provided with a V-shaped standard 201 welded thereto. The latter in turn at its upper end is provided with a cross beam including a main frame cross angle 202 welded thereto. At the outer ends of the main frame cross angle 202 there are provided arm extensions 202$^a$, bolted at 203 thereto, and extending therebeyond. These arm extensions control the length of the gangs. The arm extensions 202$^a$ at their outer ends are provided with vertical frame standards 204, of bar formation, welded thereto at 205, as is best shown in Figure 5. The frame pieces 204 at their lower ends are provided with angled clips 207 bolted thereto (preferably detachable). They have the rear ends 208 of the front frame diagonal brace rods 209 welded thereto as at 210. The diagonal brace rods 209 extend forwardly at an angle, as shown in Figure 2 of the drawings, and at their front ends they are inturned as shown at 211 and bolted at 212, as shown in Figures 10 and 14, to an angle piece 215. The latter is welded on its bottom flange (see Figure 14) at 217 to the front end of the central frame bar 200, and the bar 200 extends forwardly and is apertured at 218. An angle piece 219 is welded at 220 to the front end of the frame piece 200. It has a top flange which is apertured at 221 in aligning relation with the aperture 218 and adapted to receive a draw bar pin 222. This forms a connection for attachment to the front section frame D; the latter being provided with a U-shaped draw bar 225 bolted at 226 to the rear ends of the front section tongue angles. The axis of the draft pin 222 is vertical and intersects the center line of the first front section frame tongue 10.

Figure 13:
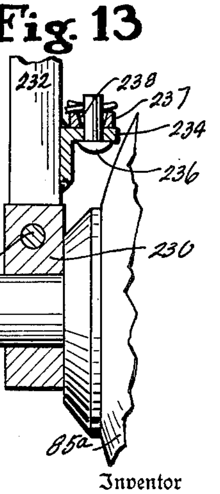
Figure 13 is a vertical cross sectional view of the swivel mounting of a disc gang of the rear section, the view being taken substantially on the line 13—13 of Figure 2.

As is usual with tandem harrow constructions the disc gangs and particularly the discs of the rear section are reversed with respect to those of the front section, and that is true in this plow construction. Each of the disc gangs H and J of the rear section C includes a dead axle 60$^a$ upon which the discs 85$^a$ are fixed for rotation therewith. Furthermore, they each include a weight receiving channel 100$^a$. The outer ends of the disc gangs H and J each include a block 230 corresponding to the block 70 of the front gang axles, welded to the axles 60$^a$ at their outer ends, as shown in Figure 2. These blocks 230 are bolted at 231 to the lower ends of detachable connecting brackets 232 secured to the floors of the channels 100$^a$ as indicated at 233 in the drawings. Each bracket 232, as seen in Figures 2 and 13 has an angle piece 234 welded thereto provided with a fixed pin 236. The latter bears in a lug 237 having a tapered opening 238 therein (Figure 13). The lug 238 is welded to an angle piece 239 which in turn is bolted to the frame standard 204. Above this, each gang is further supported upon a link connection attached to the frame. Thus, a bracket arm 240$^a$ is provided in fixed position at the outer end of each disc gang channel 100$^a$ having a link 241$^a$ pivoted thereto. The latter is pivoted at its other end to an extension lug 242$^a$ welded to the frame standard 204. The arrangement is such that as the box 240 is slid forward upon the tongue 200, the inner ends of the gangs will be slightly lifted upward, for reasons above assigned to similar gang operation for the front section B. The disc gangs H and I at their inner ends are provided with brackets 235, the lower ends of which are bolted directly to the dead axle portions of the disc gangs, and the upper ends of which are connected to the floors of the channels 100$^a$ as by bolting. This arrangement holds the axle and gangs rigid with respect to the channels 100$^a$.

Figure 15:
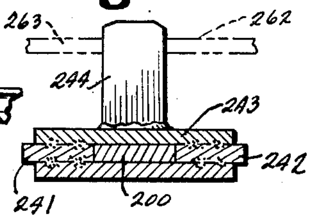
Figure 12:
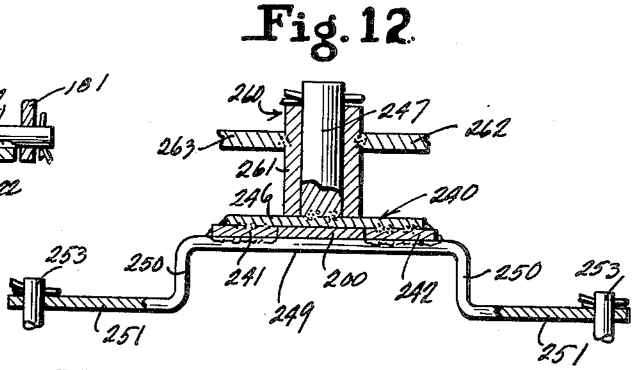
Figure 7:
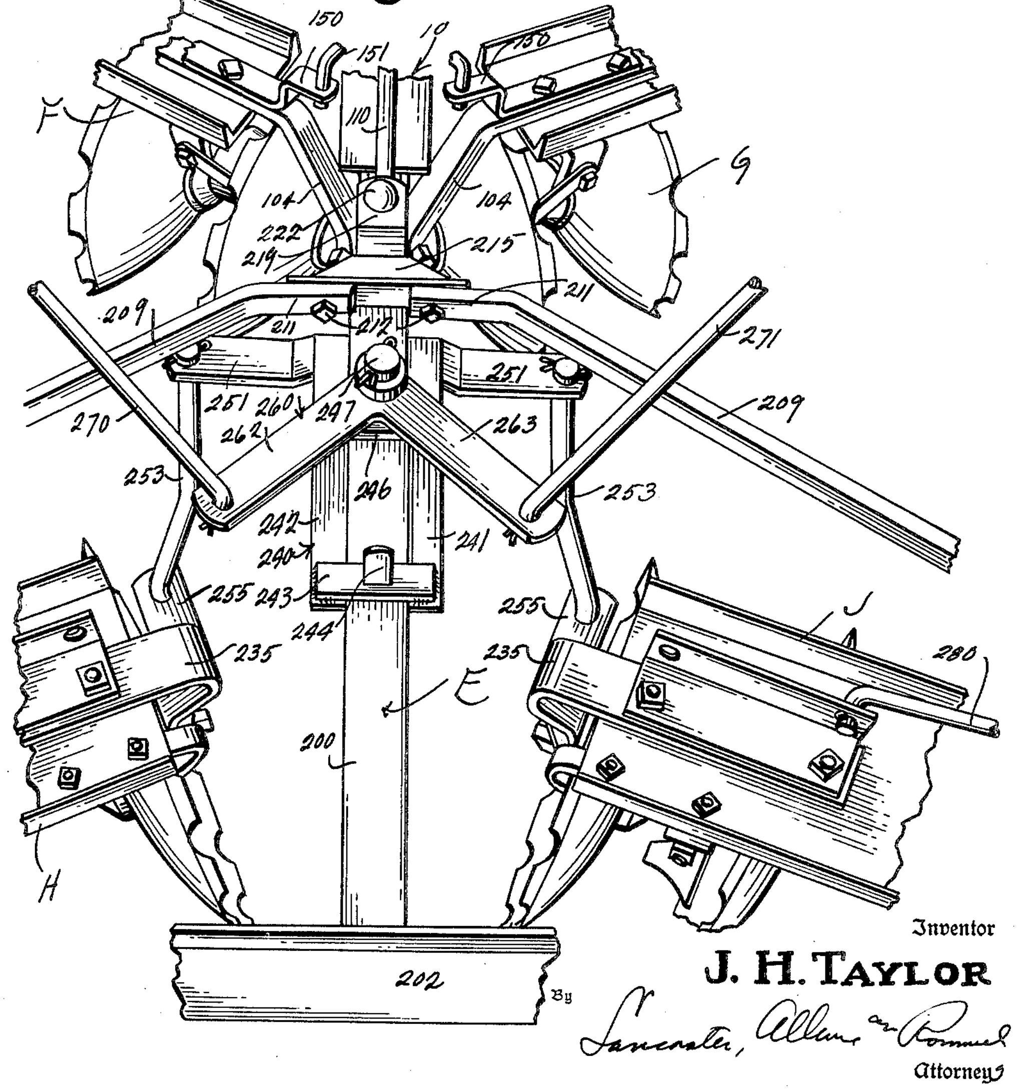
Figure 7 is a perspective view of the control means between the front and rear sections whereby to accurately regulate the rear disc gangs, the view being taken at a perspective angle from the rear of the implement.
Figure 9:
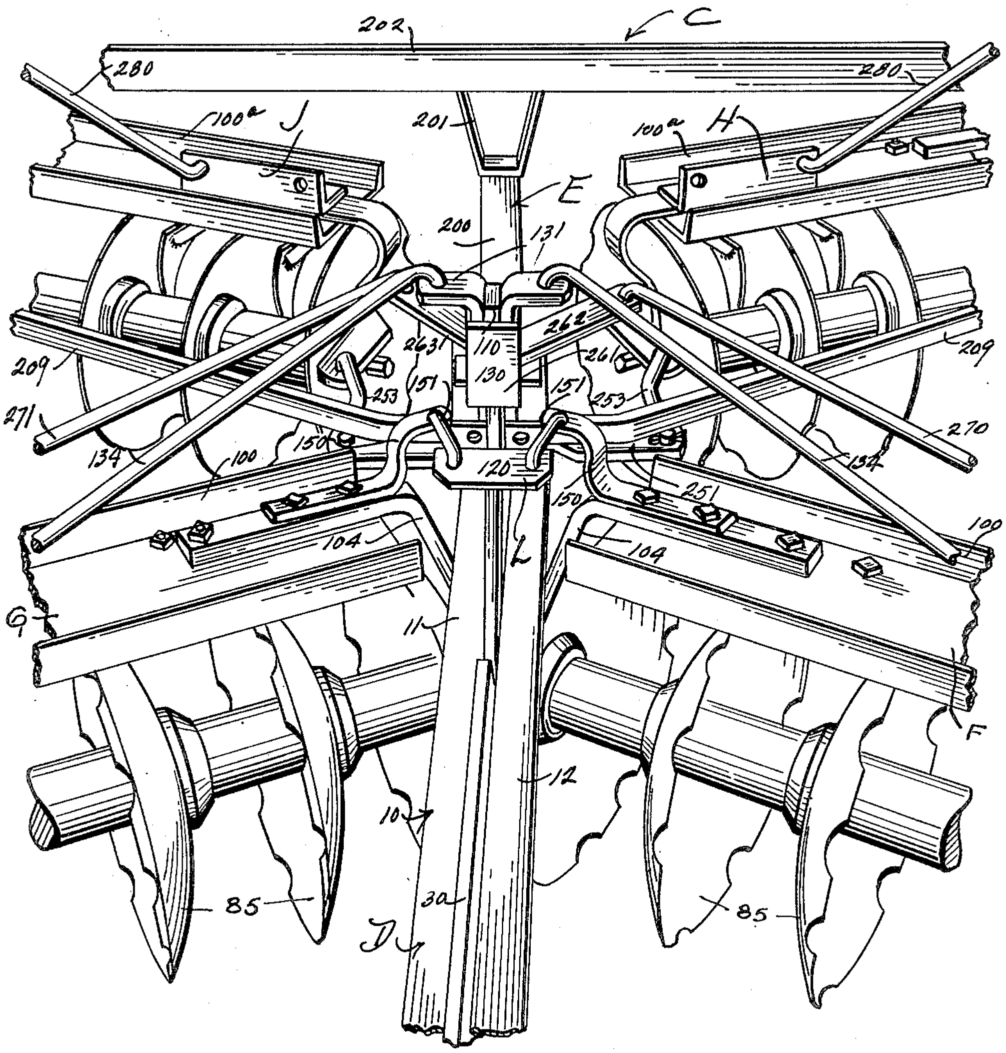
Figure 9 is a perspective view of the details shown in Figure 7, but at a perspective angle from the front of the implement.

The operating means which connects the inner ends of the rear section gang upon the frame structure E so that the disc gangs can be angled, preferably comprises a slide box 240 shown in perspective in Figure 10, and in transverse cross sectional views Figures 12 and 15. It includes side bars 241 and 242 disposed in the same plane as the central frame bar 200. Bars 241 and 242 at their rear ends are secured together by means of top and bottom cross bars 243 welded thereto. The upper cross bar 243 has an upstanding stop lug 244, the purpose of which will be subsequently mentioned. Forwardly the bars 241 and 242 have a top cross bar 246 welded thereto, as shown particularly in Figure 12; this cross piece 246 supports a spindle 247, the purpose of which will be subsequently mentioned. The lower surfaces of the side bars 241 and 242 have a cross piece 249 welded thereto as shown in Figure 12; the ends of said cross piece 249, being downturned at 250 and then outturned at 251. The outer ends 251 are apertured for receiving the stud ends of links 253; the latter at their rear ends being pivotally connected to forward extensions 255 welded upon each of the bracket arms 235, as indicated in Figure 7. This arrangement connects the inner ends of the disc gangs to the slide box structure 240 so that as the latter is slid along the frame bar 200 the gangs can be angled or placed in axial alignment, as the case may be.

The synchronizing control between the disc gangs of the front and rear sections includes a bell crank lever 260, the hub portion 261 of which is pivoted upon the slide box spindle 247, as shown in Figure 12. The bell crank lever arms 262 and 263 at their outer ends are apertured for receiving the pivot stud ends of connecting rods 270 and 271 which extend divergently forward and at their fore ends are provided with right angled stud extensions pivoted upon rearward bracket extensions 274 located at the outer ends of the front section gangs F and G, as indicated in various views of the drawings. In normal position with the rear section disc gangs in alignment as shown in Figure 1, the arms 262 and 263 will be divergently extended rearwardly. They are sufficiently long to contact the stop post 244, for the purpose of limiting the degree of movement of the bell crank lever and lateral movement of the sections B and C with respect to each other, as will be apparent from Figure 10 of the drawings.

The elevation of the inner ends of the disc gangs H and J can be regulated by means of a diagonal support rod 280 provided for each gang, the inner ends 281 of which are secured by angle pieces 282 to the channels 100ᵃ, and the outer upper ends of which are secured upon bracket pieces 283. These bracket pieces 283 are swivelly connected at 284 upon the tops of the standards 204, and the diagonal supporting rods 280 are threaded at their rear ends to receive nuts 284ᵃ by means of which the effective lengths of the rods 280 may be regulated for disposing the inner ends of the disc gangs at the desired elevation.

It will be noted from the position of parts shown in Figures 3 and 10 that when a turn is made, thru the rods 270 and 271, the bell crank control lever 260 will be pivoted upon its pin 247 and the crank turning will maintain the rear section disc gangs in a predetermined angled relation with respect to the axis of the front section, which varies with the degree of turn, except as limited by the stop post 244. Thus, the harrow rear disc gangs will hold the same degree of angle under all recurring turns and conditions so that accurate furrow widths can be maintained. The rear section construction C only has a three point hook up with the front harrow section, to wit, the two angled connecting rods and the center draw bar connection. Of course, the swinging of the front gangs forward at their outer ends to an angled position will move the slide box of the rear section forward to maintain an accurate angling of the gangs of the two sections. The fact that the rear section pivot axis of pin 222 is on the center line axis of the implement is very important, for such enables the entire rear section to change its position with respect to the front section and thru the bell crank lever arrangement permits the two rear gangs to always assume the same angled relation.

Various changes in the shape, size, and arrangement of parts may be made to the form of invention herein shown and described, without departing from the spirit of the invention or scope of the claims.

I claim:

1. In a tandem disc plowing harrow a front section having angling disc gangs and a rear section, the rear section including a frame provided with a longitudinally extending tongue and a cross beam structure, a pair of plow disc gangs pivotally connected at their outer ends to the cross beam structure for swinging forwardly and rearwardly at their inner ends, a slide box construction mounted for movement along said tongue, means pivotally connecting said slide box construction to the inner ends of the gangs of the rear section whereby sliding of the box will move said disc gangs at their inner ends forwardly or rearwardly, a bell crank lever pivoted on a vertical axis upon said slide box construction having laterally extending lever arm portions, and connecting rod means pivotally connecting the outer ends of said lever arm portions of the bell crank lever to the front plowing section disc gangs whereby angled movement of the latter will rock said lever for controlling angling of the rear section disc gangs.

2. In a rear section construction for tandem disc harrows the combination of an elongated frame tongue and a cross frame beam, plowing disc gangs pivotally connected at their outer ends to the outer ends of the frame beam at opposite sides of said tongue, a slide box construction mounted for movement along said tongue, means pivotally connecting said slide box construction to the inner ends of said disc gangs whereby the latter will be moved with movement of the slide box construction along said tongue so as to angle the position of said disc gangs, a bell crank lever pivoted on a fixed vertical axis upon said slide box construction, and diagonal connecting rods connected with the ends of the bell crank lever remote from its pivot axis for connection with a front section of the tandem disc harrow.

3. In a tandem disc harrow the combination of a front section including a frame having a longitudinally axially disposed tongue portion, a pair of disc gangs swivelly connected at their inner ends to the rear of said tongue, a slide box construction movable along said tongue, diagonally disposed rods connecting said slide box with the outer ends of said disc gangs whereby to angle the latter, a rear section including a frame having a longitudinally axially disposed tongue portion and a transverse disc gang supporting beam at the rear portion of the tongue portion last mentioned, a pair of disc gangs pivotally connected at their outer ends to the remote ends of said cross beam construction, a slide box construction movable along the tongue of the rear section, swivel link means connecting said slide box construction with the inner ends of the disc gangs of the rear section, a bell crank lever pivotally mounted on a fixed vertical axis upon the slide box construction of the rear section including laterally extending arms at opposite sides of said tongues of the rear section, diagonally disposed connecting rods pivotally connected to the outer ends of the arms of the bell crank lever and extending divergently forwardly and at their forward ends being pivotally connected to the outer ends of the disc gangs of the front section.

4. A tandem disc plowing harrow as described in claim 3 wherein means is provided for elevating the outer ends of the front section disc gangs as they are swung forwardly and for elevating the inner ends of the disc gangs of the rear section as said disc gangs of the rear section are swung forwardly.

5. In a tandem disc harrow construction the combination of front and rear sections, the front section including a frame and a pair of disc gangs pivoted at their inner ends to the frame and having means for swinging the outer ends in angled relation with respect to the longitudinal axis of the front section, a rear section including a frame, draw bar means pivotally connecting the rear section frame of its forward end to the front section frame on a vertical axis in the line of the longitudinal axis of the front section frame, the frame of the rear section including a central axially disposed tongue and a cross beam construction, a pair of disc gangs for the rear section, means pivotally connecting said disc gangs of the rear section at their outer ends to the outer ends of said cross beam, a slide box construction mounted for sliding upon and along the tongue of the rear section, pivotally connected means between said slide box construction and the inner ends of the gangs of the rear section whereby as the slide construction is moved along said tongue the inner ends of the said disc gangs will be angled with respect to the longitudinal axis of the said tongue, a bell crank lever mechanism pivotally mounted on a vertical axis upon said slide box construction and which vertical axis is disposed in the longitudinal axis of said tongue, and connecting means between the crank portions of the bell crank lever mechanism and the outer ends of the disc gangs of the front section whereby when the front section disc gangs are swung to an angled position the slide box of the rear section will move along the tongue of the rear section for proportionally angling the disc gangs of the rear section.

References Cited in the file of this patent

UNITED STATES PATENTS

| Number | Name | Date |
|---|---|---|
| 1,621,622 | Brenneis | Mar. 22, 1927 |
| 1,830,993 | Furrer | Nov. 10, 1931 |
| 2,163,818 | White | June 27, 1939 |
| 2,239,948 | Young | Apr. 29, 1941 |
| 2,266,590 | Dyrr | Dec. 16, 1941 |
| 2,376,609 | McVicar | May 22, 1945 |
| 2,380,298 | Dyrr | July 10, 1945 |
| 2,470,008 | White et al. | May 10, 1949 |
| 2,579,086 | Oehler | Dec. 18, 1951 |
| 2,584,238 | Sonneman | Feb. 2, 1952 |